United States Patent [19]
Sztamler et al.

[11] 3,754,220
[45] Aug. 21, 1973

[54] APPARATUS FOR DETECTING URINARY BLADDER OUTFLOW

[75] Inventors: Bernard Sztamler, Naharia; Mordechai Haim Diskin; Alexander Vilensky, both of Haifa, all of Israel

[73] Assignees: Technion Research and Development Foundation Limited; Elmedix Limited, Haifa, Israel

[22] Filed: Aug. 16, 1971

[21] Appl. No.: 172,273

Related U.S. Application Data
[63] Continuation of Ser. No. 849,040, Aug. 11, 1969, abandoned.

[52] U.S. Cl. .................. 340/239 R, 128/2.05 F
[51] Int. Cl. ............................ G08b 21/00
[58] Field of Search ................... 340/239 R; 128/DIG. 13, 2 R, 2.05 F, 2.05 P

[56] References Cited
UNITED STATES PATENTS
3,500,366  3/1970  Chesney................. 340/239 R X
3,631,437  12/1971  Campbell et al............... 340/239 R
3,390,577  7/1968  Phelps et al............. 340/239 R UX
3,553,583  1/1971  Wiley..................... 128/DIG. 13 UX Primary Examiner—John W. Caldwell
Assistant Examiner—Daniel Myer
Attorney—Harry C. Bierman, Bierman & Bierman and Jordon B. Bierman

[57] ABSTRACT

Apparatus for monitoring liquid outflow, particularly from bladders, comprising a fluid drop detector giving an output signal for each drop, reset unit with an input connected to the output of the drop detector, a presettable timer which is reset to zero when a pulse is received from the reset unit, and an indicator connected to the timer which is activated when the time between successive pulses is greater than a predetermined value.

4 Claims, 6 Drawing Figures

INVENTORS
BERNARD SZTAMLER
MORDECHAI HAIM DISKIN
ALEXANDER VILENSKY
BY
Bierman & Bierman ATTORNEYS

3,754,220

APPARATUS FOR DETECTING URINARY BLADDER OUTFLOW

This application is a continuation of application Ser. No. 849,040 filed Aug. 11, 1969 now abandoned.

Apparatus of the foregoing type including a cyclic counter between the drop detector and the reset unit so that the reset unit receives a signal only after a predetermined number of drops have been counted by the drop detector.

Apparatus for monitoring liquid outflow comprising a fluid drop detector giving an output signal for each drop, a counter having a count level output resettable to zero on signal, a count level detector connected to the output of the counter which gives a signal when the number of counts is less than a predetermined number during a given time period, a timer giving a command signal at the end of each said period to the count level detector and simultaneously giving the same signal to the counter whereby said counter is reset to zero, an indicator actuated when the counts noted are below a predetermined number.

This invention relates to an apparatus for detecting the stoppage of flow of fluid out of urinary bladders.

In post-operative irrigation procedures for urinary bladders, and in other conditions in which blood may appear in the bladder and urine, there is a grave danger that a blood clot may clog the catheter used for draining the urinary bladder.

The present invention permits the detection of stoppage of the flow of bladder fluids before a large volume of fluid accumulates in the bladder due to blockage of the outlet. The danger of the accumulation of large volumes of fluid in the bladder lies in the possibility that the build-up of pressure inside the bladder may rupture or partially open sutured incisions. In other pathological conditions of the bladder and urinary tract, the high pressure may aggravate the condition.

In the first embodiment of the invention, a drop detector senses the fall of drops of fluid passing through the catheter. These drops are timed to determine the period between the drops. In the event that drops stop falling, or fall too slowly an indicator and/or alarm is actuated. This embodiment of the invention operates adequately when the rate of flow of fluid is relatively uniform.

However, if this rate of flow varies over a wide range, there are two distinct undesirable events that may occur. First, if a short permissible time interval between drops is selected, there is a danger of a false alarm, i.e, even though no drops have fallen, the catheter is really not blocked. What has happened is merely that urine, or other bladder fluids have not built up sufficiently in the bladder to flow out of the catheter placed there for draining. On the other hand, if the permissible time interval between drops is increased in length, there is a possibility that pressure in the bladder may build up to undesirable values. This will be the case when the catheter, for example, is only partially blocked, and a very small flow exists; sufficient to satisfy the time requirements of the timing circuit, but insufficient flow to prevent the buildup of high pressures in the bladder.

To overcome this limitation of the first embodiment of the invention, the duration of time measured out by the timing circuit is preferably not based on the interval between individual drops, but rather, a time interval is chosen for a number of drops in succession; say 10 drops for example. In this way the apparatus checks for the existence of a certain minimal average flow even under conditions of wide variations in fluid flow, or drop fall rate.

A third embodiment of the invention is constructed so that for a given predetermined interval of time, acount is made of the number of drops that fall in the drop detector. If this number is equal to or greater than a certain minimal number, say 10 drops, no alarm or indication is given. If the number of drops that have fallen is less than this amount, the apparatus will set off an alarm.

The embodiments of the invention are described in the following figures in which.

Figure 1:
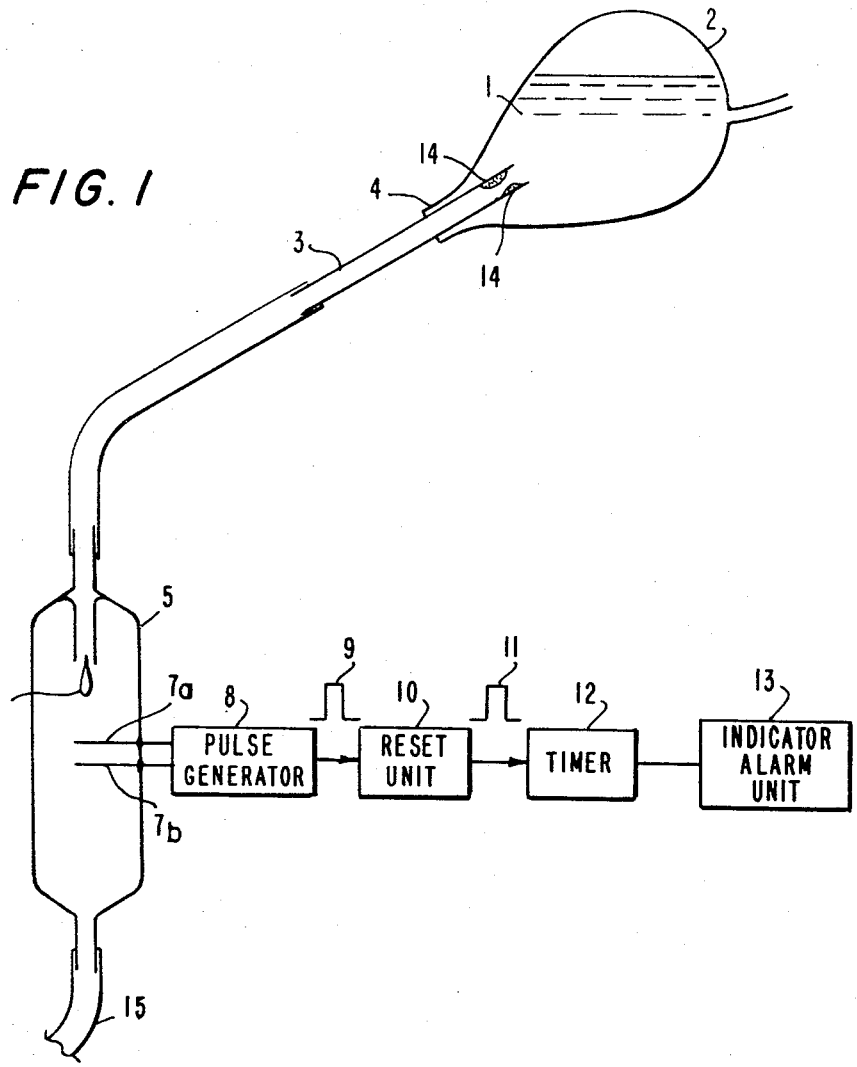
FIG. 1 is a schematic diagram of the first embodiment of the invention in which the interval of time between individual drops of fluid flowing out of the bladder is measured.

Referring more specifically to FIG. 1, fluid 1 in bladder 2 flows out through catheter 3 inserted in urethra 4. Fluid 1 thence passes to drop chamber 5 in which bladder fluid drop 6 is seen falling. In this type of drop chamber, drop 6 falls between drop detecting electrodes 7a and 7b and in so doing makes electrical contact therebetween. The resulting lowering of resistance between electrodes 7a and 7b causes a pulse 9 to be generated in pulse generator 8. Pulse 9 is amplified in reset unit 10 and amplified pulse 11 is produced at the out put of the reset unit. Each amplified pulse 11 is used to reset timer 12 so that for each pulse 11 the timing cycle is reinitiated. In the event that the interval of time between two successive falling drops is greater than the length of time selected as measured by timer 12 an indication and/or alarm will be given by the indicator-alarm unit 13. This will occur when the catheter 3 is wholly or partially blocked by a blood clot 14 or other blocking material. In general, there will be a flow of fluid out of the apparatus through outlet tube 15.

Figure 2:
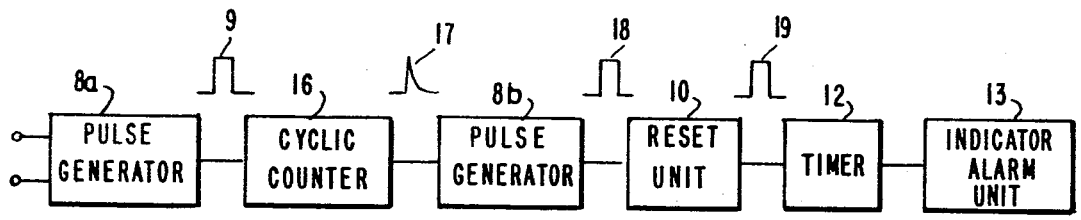
FIG. 2 is a schematic diagram of the second embodiment of the invention in which a measurement is made of the interval of time during which a given predetermined number of drops of fluid flow out of the bladder.

In the schematic diagram of FIG. 2, a signal is obtained from electrodes 7a and 7b as in the embodiment of FIG. 1, and this signal causes pulse 9 to be generated in pulse generator 8a, which is counted in cyclic counter 16 until, for example, 10 pulses in succession are registered. Upon counting the tenth pulse, cyclic counter 16 will produce a trigger pulse 17 which causes long pulse 18 at the output of second pulse generator 8b. The pulse 18 is amplified in reset unit 10 and pulse 19 is produced and fed into timer 12. Thus, for each pulse 19 timer 12 is reset so that the timing cycle is reinitiated. In the event that the interval of time between two successive groups of 10 drops is greater than the length of time selected as measured by timer 12 an indication and/or alarm will be given by indicator-alarm unit 13. The alarm will be given in the event of partial or total blockage of the catheter, and regardless of variations in flow rate, or drop falling rate over very wide limits.

Figure 3:
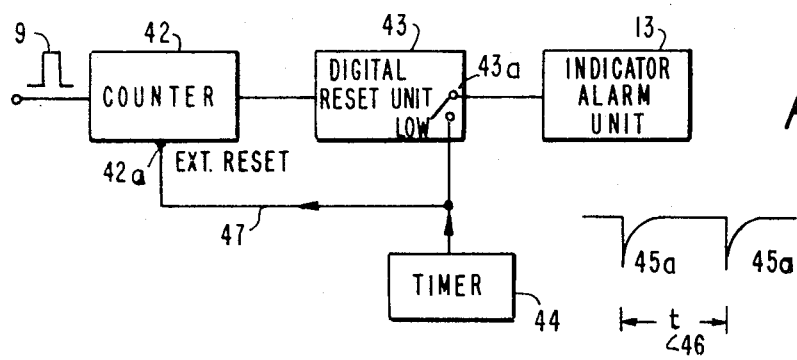
FIG. 3 is a schematic diagram of the third embodiment of the invention in which a measurement is made of the number of drops that have fallen in a drop detector during a given, predetermined interval of time.

In the schematic diagram of FIG. 3, each pulse 9 (resulting from falling drop 6, as explained previously for FIGS. 1 and 2) is counted in counter 42 to which digital preset unit 43 is attached. Timer 44 generates a series of continuous pulses 45a, 45b, etc., separated by a fixed interval 46 of time $t$. Each timing pulse is fed to gating relay 43a of digital preset unit 43. If gating relay 43 is closed the number of drops counted during a given interval $t$ is lower than the preset value and an alarm will be given by alarm unit 13. If on the other hand the number of drops counted is equal to or greater than the desired preset value gating relay 43 will reamin open, and no alarm will be sounded.

In order that the apparatus act continuously and automatically, pulses 45a, 45b, etc., as they are formed are also applied through line 47 to the external preset terminal of counter 42a, and in this way the counter is reset to zero at the start of each new period.

Figure 6:
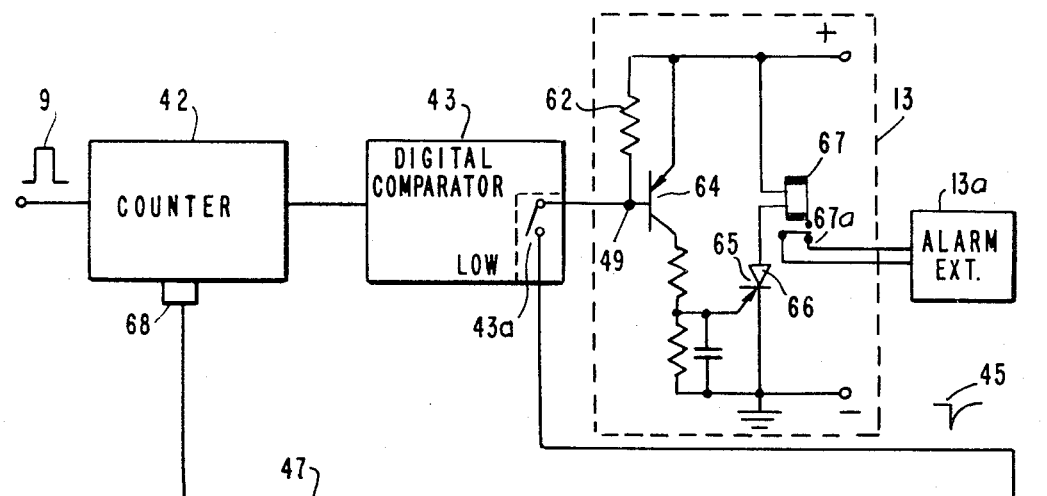
FIG. 6 is a circuit diagram of the third embodiment of the invention in which a count is made of the number of drops falling during a certain time interval.
Figure 6:
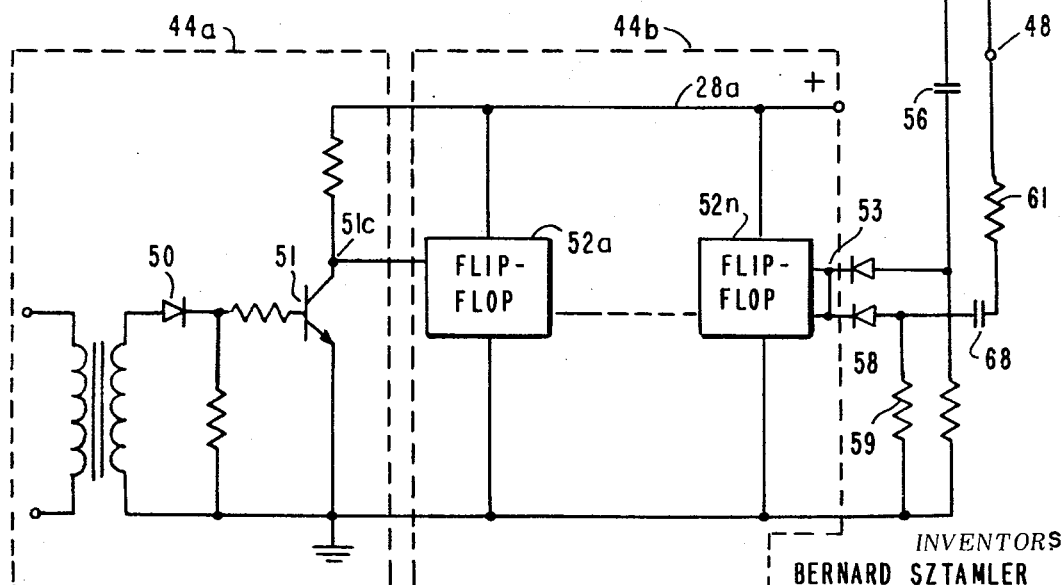

Examples of the three embodiments of the invention as described schematically in FIGS. 1, 2 and 3 will now be given. It should be understood that the particular forms shown in the circuit diagrams of FIGS. 4,5 and 6 are only three of a great number of possibilities apparent to those versed in the art of counting and timing circuits.

Figure 4:
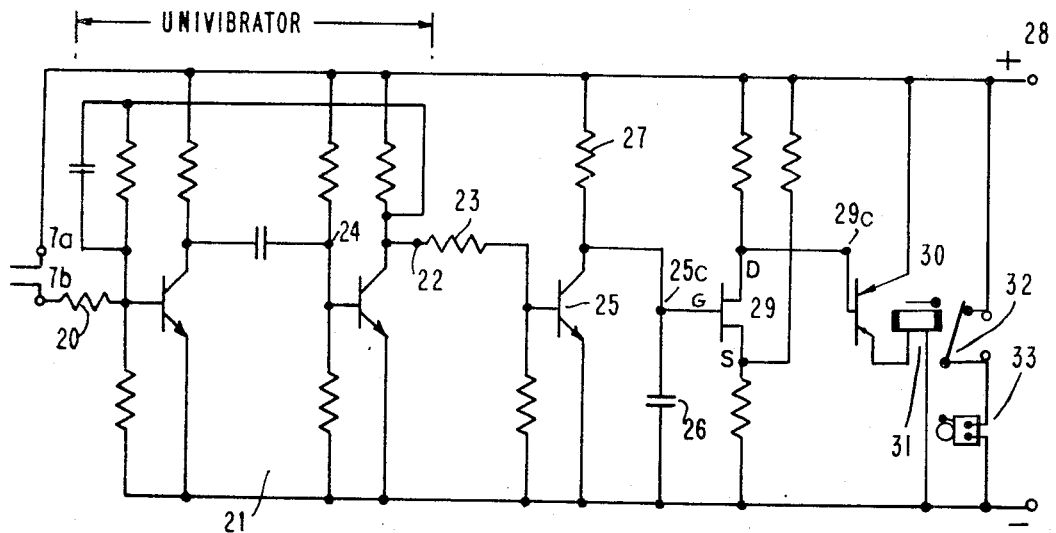
FIG. 4 is a circuit diagram of the first embodiment of the invention in which the time interval between each and every drop is measured.
Figure 5:
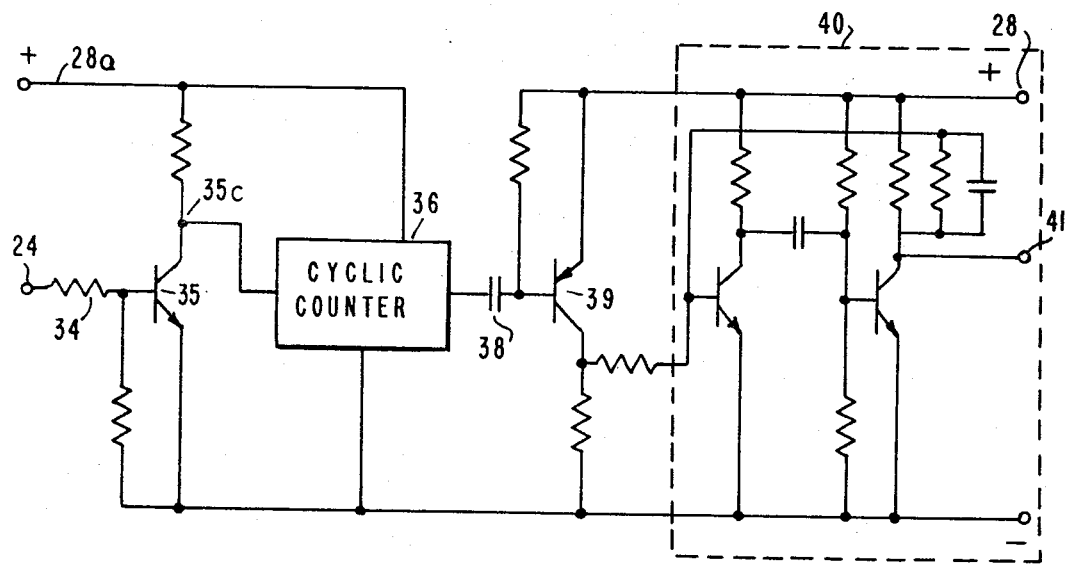
FIG. 5 is a circuit diagram of the second embodiment of the invention in which the time interval between a certain number of drops is measured.

FIG. 4 is a circuit diagram of the apparatus of the invention in which bladder outflow stoppage is determined on the basis of measuring or metering the interval of time between individual drops of the fluid flowing out of the bladder.

As described previously in connection with FIG. 1 falling drop 6 impinges on both electrodes 7a and 7b, causing a lowering of resistance therebetween. Referring now to FIG. 4, when the resistance between the electrodes 7a and 7b drops considerably, current will flow through resistor 20 which puts the univibrator circuit 21 into its quasistatic condition, and a voltage pulse appears at terminal 22. Note that the univibrator circuit 21 is but one of several types of usable pulse generators. The generated pulse is conducted through resistor 23 and drives transistor 25 to saturation during the time that the pulse prevails. This has the effect of discharging capacitor 26. After passage of the pulse, the charge on capacitor 26 is reestablished by current flowing from supply voltage connection 28 through resistor 27. Thus, during the time that capacitor 26 is charging, the voltage at connection 25c is increasing with passage of time. If a sufficiently long period of time passes, the voltage at point 25c will rise to a value that enables field effect transistor 29 to conduct. This causes the voltage at point 29c to drop below supply voltage 28. As a result, transistor 30 saturates. The ensuring current energizes relay 31 which closes contacts 32 so that alarm 33 is actuated. If drops 6 falling in drop detector 5 fall quickly enough, capacitor 26 never has sufficient time to build up its charge and voltage to a high enough value, field effect transistor 29 will remain quiescent, and no alarm will be given.

Thus it can be seen that the transistor 25 and its associated electronic components fulfil the role of the reset unit 10 of FIG. 1. Timer 12 of FIG. 1 is exemplified by the RC circuit consisting of resistor 27, capacitor 26 and field effect transistor 29. Finally, by way of example only, the indicator-alarm unit 13 of FIG. 1 is shown by transistor 30 and bell 31 with their associated components.

FIG. 5 is a circuit diagram of a portion of the device whose schematic diagram is given in FIG. 2. The bladder outflow stoppage is determined on the basis of measurement of the time interval for a certain number of drops of fluid to flow out of the bladder. The part of the apparatus of the invention shown in FIG. 5 corresponds schematically to cyclic counter 16 and pulse generator 8b of FIG. 2. The remainder of the apparatus for the embodiment of FIG. 2 has already been shown in FIG. 4.

For the second embodiment of the invention, the circuit shown in FIG. 5 must be connected into the existing circuits of the first embodiment of the invention as shown in FIG. 4. To do this, the connecting wire between collector 24 and connection point 22 must be removed. In FIG. 5 input resistor 34 for the cyclic counter 36 and pulse generator 40 are connected to collector connection point 24. At the output stage of pulse generator 40 the collector 41 is connected to connecting point 22. Thus, adding the circuit of FIG. 5 to the circuit of FIG. 4 as just described, an apparatus whose schematic diagram is given in FIG. 2 is obtained. For this second embodiment of the invention, everytime a drop 6 falls upon and causes a lowering of resistance between electrodes 7a and 7b, a pulse appears at collector 24. The pulse is repeated by transistor 35 which acts as a buffer, so that a pulse of inverse polarity and lower voltage appears at collector 35c. This pulse is fed into the cyclic counter stage 36, which consists of four interconnected integrated microelectronic binary logic circuits which are standard items of manufacture (for example Motorola Corp. manufactures these as units MC–848). These four units are interconnected to act as a standard divide by ten counter. Thus the tenth pulse of a series of pulses appearing at collector 35c (once the zero position of the cyclic counter 36 has been passed) will produce a signal pulse at the output of counter 37. The output pulse at 37 is differentiated by capacitor 38, amplified by transistor 39 and actuates univibrator 40 (pulse generator). The output pulse of the univibrator appears at collector 41 of the second transistor, and this output is connected to connection point 22 as shown in FIG. 3. For the second embodiment of the invention the connection between points 24 and 22 has been opened. The pulse now appearing at resistor 23 (of FIG. 4) operates the rest of the circuit — the reset stage, time, and alarm circuit — as previously described.

Hence, if 10 drops fall in succession in a period of time that is less than the time interval determined by the RC circuit, resistor 27, and capacitor 26 (FIG. 4), then the circuit continues to recycle itself without giving any alarm. If on the other hand, 10 drops do not fall within this period of time, then an alarm will be given as explained previously.

Thus, the requirement that 10 drops fall within a given period of time before an alarm is given ensures that minimal flow always occurs out of the bladder. This is the major advantage of the second embodiment of the invention. Additionally, because of the relatively long overall time period of the instrument (10 drops are required to fall), any erratic changes in flow rate will not set off a spurious alarm signal. However, with a serious blockage of fluids flowing out of the bladder the apparatus will act to give an alarm.

A circuit diagram for the third embodiment of this invention is shown in FIG. 6. This is given by way of example only and represents only one of many possible combinations of electrical, mechanical, and other elements capable of performing the functions indicated in the corresponding schematic diagram of FIG. 3. Pulse 9, resulting as a consequence of a falling drop 6 (as explained previously) is fed into counter 42 which in this case is a commercially available counter (Model 101A produced by the Monsanto Co.). The output of counter 42 is fed continuously into the digital comparator 43 (Elron Model M-60) which is utilized in its "low level preset" mode only. If the number of pulses counted and fed into the comparator is more than the value preset into comparator 43, then the contacts 43a of comparator 43 will be open as shown. If on the other hand the number of pulses counted is less than the preset value, then contacts 43a will be closed. This electrically connects points 48 and 49 through the contacts, thus permitting timing pulse 45 to actuate alarm unit 13.

Timer 44 of FIG. 3 is embodied in two subunits; time base unit 44a, and divider unit 44b (as shown in FIG. 6). Diode 50, of the time base unit produces a half-wave rectified output which is fed to the base of transistor 51. The output of the transistor that appears at its collector 51c is a square wave, whose frequency is the same as that of the line frequency to which the entire apparatus is connected. The square wave output is fed to input stage 52a of divider unit 44b. Input stage 52a is a flip-flop bistable binary counter (Model MC848 produced by Motorola Inc.). Fourteen such units are connected in series from first unit 52a to the final unit 52n. Each unit of the series doubles the period of its input pulse (acts as a frequency divider of 1:2), thus, the pulse appearing at the last stage of unit 52n at output point 53 has a period of time between pulses which is longer than the period of the line frequency at transformer 54 by a factor of 2$^{14}$. The negative sloped leading edge of the square wave pulse appearing at output 53 is differentiated by the combination of capacitor 60 and resistor 62 to produce sharp pulse 45. Current limiting is provided by series resistor 61. Diode 58 and resistor 59 act to prevent the square wave edge having a positive slope from being differentiated. Thus, when relay contacts 43a are closed and pulse 45 is generated, transistor 64 of alarm unit 13 is momentarily saturated, and in this case, gate 65 of the SCR unit 66 is raised in voltage so that the SCR is fired, and actuates relay 67 which closes contacts 67a so that an external alarm 13a (bell, siren and/or warning lights) is actuated. In the event that contacts 43a are open, no pulse 45 will be generated, and no alarm can be given.

In order for the apparatus to act continuously and automatically, the square wave appearing at output 53 of the divider unit 44b is coupled by capacitor 56 to the reset terminal 68 of counter 42 through connecting line 47. The pulse thus formed acts to reset the counter, and the entire cycle of operations begins anew.

The invention has been described in terms of specific embodiments, but it should be understood that these are by way of illustration only and that the invention is not necessarily limited thereto. Alternative constructions will become apparent to those skilled in the art in view of this disclosure, and modifications of the apparatus disclosed herein are to be contemplated within the spirit of this invention.

We claim:

1. An apparatus monitoring liquid outflow comprising
   a fluid drop detector having an output and giving an output signal for each drop of fluid passing within said detector,
   a counter having an input connected to the output of said drop detector, and having a count level output resettable to zero upon receipt of a command signal,
   a count level detector having an input connected to the count level output of the counter which gives an output signal when the number of counts at the count level input is less than a predetermined number during a given time period,
   a timer giving a command signal at the end of each said period to the count level detector directing it to note the number of counts appearing in the count level detector, said timer adapted to give the same command signal to said counter whereby the counter is reset to its zero count position, and
   an indicator having an input connected to the output of the count level detector, said indicator being actuated when the counts noted are less than a predetermined number.

2. An apparatus for monitoring liquid outflow comprising
   a fluid drop detector having an output and giving an output signal for each drop of fluid passing within said detector,
   a reset unit having an input connected to the output of the drop detector,
   a presettable timer adaptable to be reset to its zero time position each time a pulse is received from said reset unit,
   an indicator having an input connected to said timer and adapted to be activated when the time between two successive pulses from said reset unit is greater than a predetermined value, and
   a cyclic counter having an input and an output, said cyclic counter input being connected to the output of said drop detector, said cyclic counter output connected to the input of said reset unit, whereby the reset unit receives a signal from the cyclic counter only after a predetermined number of drops have passed through the drop detector.

3. An electronic device for monitoring outflow comprising:
   a pair of electrodes,
   a D.C. voltage source connected to the electrodes impressing a voltage across the electrodes,
   a resistor connected in series with the electrodes through which current will flow when a drop passes between the electrodes, said resistor having an output, and a pulse generator connected to said resistor output for producing a signal pulse each time the current flows in said resistor,
   a cyclic counter which, upon receiving a preset number of pulses from said pulse generator, will generate a second output pulse,
   a reset component comprising a transistor connected in series with the cyclic counter, said transistor being normally non-conductive until it receives said second output pulse, a timing device comprising;

a half wave rectifier;

a transistor connected to the output of the rectifier which generates a square wave of prescribed frequency;

a plurality of flip-flop bistable binary counters connected in series;

a means for connecting the first counter to said transistor, and a field effect transistor connected to the output of said series of counters, said field effect transistor being activated by said output of said series of counters.

4. An electronic device of monitoring outflow comprising:

a resistance sensitive drop detector for generating a signal pulse each time a drop passes within it, a resettable counter connected in series with the drop detector to receive and count the signal pulses, a digital comparator connected in series with the counter and which receives output therefrom for comparing the actual drop rate with a selected drop rate, and an indicator activated by said comparator in the event that less than the said predetermined number of drops enter said detector within the prescribed time.

* * * * *